340-633 SR
4/7/87 OR H 000,248

United States Statutory Invention Registration [19]

[11] Reg. Number: H248
[43] Published: Apr. 7, 1987

Middlebrooks

[54] FUSE STATUS INDICATOR SYSTEM

[75] Inventor: Herbert Middlebrooks, Columbus, Ga.

[73] Assignee: The United States of America as represented by the Secretary of the Army, Washington, D.C.

[21] Appl. No.: 646,535

[22] Filed: Sep. 4, 1984

[51] Int. Cl.[4] ..... G08B 21/00
[52] U.S. Cl. ..... 340/639; 340/638; 337/241; 337/376
[58] Field of Search ..... 340/517, 519, 521, 522, 340/638, 639, 644, 641, 642; 361/41, 104; 337/242, 243, 265, 266, 332, 376

[56] References Cited

U.S. PATENT DOCUMENTS

| | | | |
|---|---|---|---|
| 2,726,378 | 12/1955 | Norcross | 340/638 |
| 3,546,692 | 12/1970 | Salzer | 340/517 |
| 3,643,247 | 2/1972 | Ratcliffe | 340/517 |
| 4,498,077 | 2/1985 | Richardson | 340/644 X |

FOREIGN PATENT DOCUMENTS

| | | | |
|---|---|---|---|
| 7503428 | 9/1976 | Netherlands | 340/638 |
| 2034542 | 6/1980 | United Kingdom | 340/638 |

OTHER PUBLICATIONS

IBM Technical Disclosure Bulletin, vol. 13, No. 1, Jun. 1970; "Blown Fuse Sensor" by H. E. Lower; pp. 59 & 60.

Practical Electronics, vol. 12, No. 7, Jul. 1976; "Fuse Failure Warning" by N. Ruiz; p. 593.

IBM Technical Disclosure Bulletin, vol. 13, No. 3, Aug. 1970; "Circuit Condition Indication" by E. B. Carey et al.; p. 680.

*Primary Examiner*—Stephen C. Buczinski
*Assistant Examiner*—Linda J. Wallace
*Attorney, Agent, or Firm*—Anthony T. Lane; Robert P. Gibson; Jeremiah G. Murray

[57] ABSTRACT

An on-line indicator connected to each fuse of an electrical circuit includes an LED which becomes illuminated if its protected fuse blows. Groups of these on-line indicators can be connected via an OR gate to a single master fuse status indicator which also includes an LED which becomes illuminated if any of the on-line indicators connected thereto has its LED illuminated. The circuitry can accommodate power supplies of different voltages of either polarity. Opto-isolators can be used to reduce stand-by current drain and to isolate the on-line indicators from each other.

5 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FUSE STATUS INDICATOR SYSTEM

The invention described herein may be manufactured, used, and licensed by or for the Government for governmental purposes without the payment to me of any royalties thereon.

BACKGROUND OF THE INVENTION

Many sophisticated electronic circuits comprise a large number of fuses for protecting the circuitry and its power supplies against damaging short circuits and other excessive current drains. In such systems a single "blown" fuse usually means that the entire electronic device must be shut down until the defective fuse is found and replaced. This can require extensive time of skilled technicians and results in excessive down time of the hardware. The system of the present invention permits blown or open fuses to be quickly detected. The output of the system comprises a visual indictor which may comprise a light emitting diode (LED) which is connected to each one of the fuses of the system and is arranged to illuminate if its connected fuse fails or blows. A plurality of these on-line indicators may be connected to a master indicator which will indicate whether any one of the on-line indicators connected thereto has a defective fuse. This connection to the master indicator forms an OR gate. Such on-line indicators may be provided for all of the fuses or circuit breakers on an electronic sub-asssembly such as a circuit board, with all of the LEDs and associted circuits comprising these on-line indicators mounted on the circuit board. The aforementioned master indicator for all of the on-line indicators on a particular circuit board may then be located on the console or main control panel of the overall system. Thus illumination of the master fuse status indicator would indicate which of many circuit boards has the defective fuse and the technician would then simply inspect this board and its on-line indicators to quickly pinpoint the defective fuse and/or circuit.

SUMMARY OF THE INVENTION

The on-line indicators may comprise a diode connected to the load side of the fuse being monitored in such a way that the normal load voltage back biases the diode. This diode is connected to a transistor which is saturated when the diode is back biased. The transistor has an LED connected to its collector electrode. In the saturated state of the transistor, the LED voltage will be too low to illuminate it, however a short circuit in the load will cause the aforementioned diode to become forward biased and the resulting current there through will change the bias conditions on the transistor so that it becomes cut off and its collector voltage will rise and the LED becomes illuminated. A large number of these on-line indicators may be connected to a master indicator, as explained above. On-line indicators of this type can be designed to operate with either negative or positive power supplies simply by changing the polarities of the diodes and the bias supplies for the transistor and utilizing another type of transistor.

In two other embodiments of the invention, the LED of each on-line indicator is connected in series with a current-limiting resistor across the fuse being protected. When the fuse blows and becomes an open circuit, all of the supply voltage is applied to the LED-resistor series circuit and also to the optical or LED portion of an opto-isolator which is connected in parallel with the LED comprising the on-line indicator. The output of the LED of the opto-isolator then renders either a Darlington circuit or a reverse biased diode conductive. The resulting current is then applied to a master indicator via an isolation diode. The use of opto-isolators of this sort reduces the stand-by current to negligible values as well as providing isolation between the different fused circuits.

It is thus an object of the invention to provide circuitry for indicating the status of all fuses in a multi-fused electrical circuit.

Another object of the invention is to provide circuitry for quickly identifying a faulty or blow fuse or circuit breaker in a circuit which contains several fuses and/or circuit breakers.

Another object of the invention is to provide a novel fuse indicator system in which each fuse is provided with a substrate visual indicator for fuse malfunction and groups of fuses are provided with a master indicator which provides a visual and/or audible signal should any of the fuses of the group malfunction.

A still further object of the invention is to provide a fuse status indicator system which draws minimal current in the stand-by condition.

These and other objects and advantages of the invention will become apparent from the following detailed description and the drawings.

DETAILED DESCRIPTION OF A PREFERRED EMBODIMENT

Figure 1:
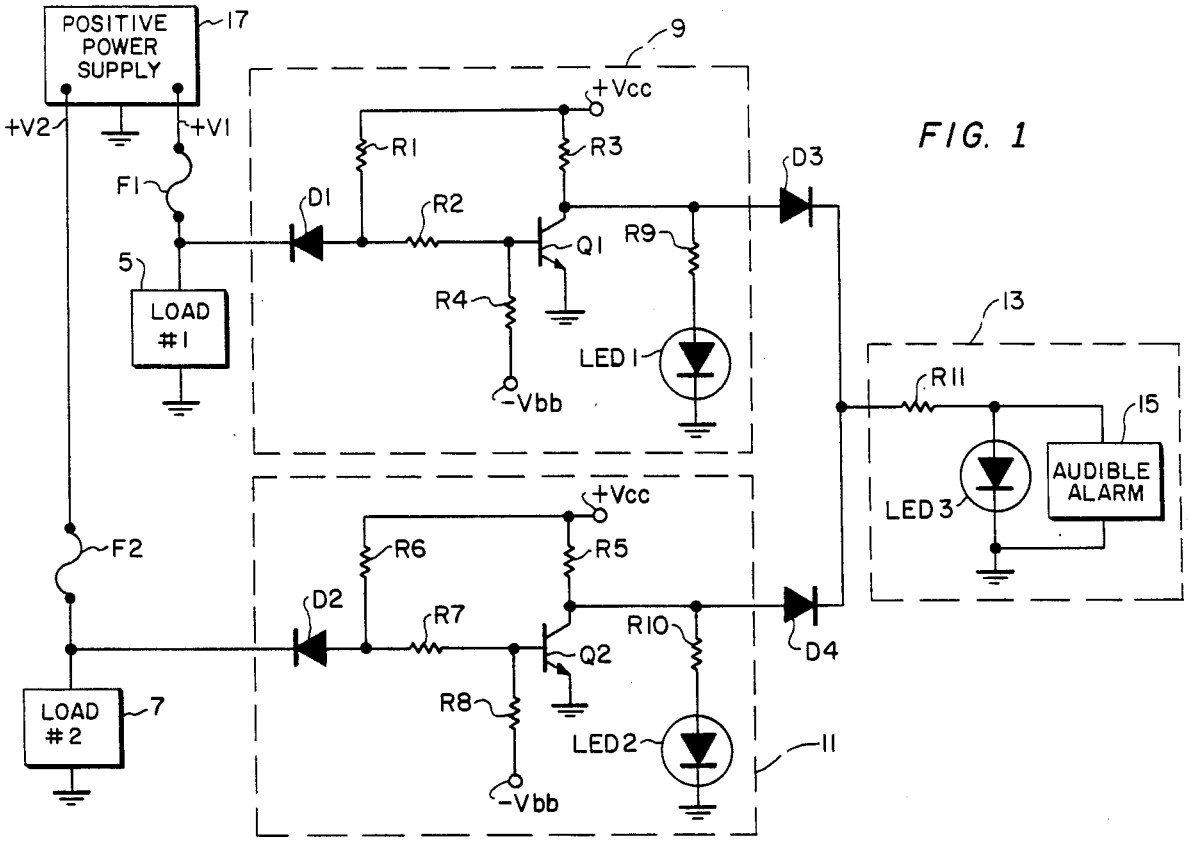
FIG. 1 shows a fuse status indicator circuit for use with positive power supplies.

The system of FIG. 1 comprises a positive power supply 17 which has two positive voltage outputs +V1 and +V2 which may or may not be the same positive voltages. Each of these voltage outputs supplies separate loads, load #1, 5, and load #2, 7, with each load separately fused by means of fuses F1 and F2, respectively. Each of the fuses is provided with an on-line fuse status indicator. The circuitry within the dashed-line box 9 comprises the on-line indicator for fuse F1 and 11 the on-line indicator for fuse F2. The circuitry of these on-line indicators is similar and each comprises a means to sense the voltage on the load side of the fuse being monitored and a light emitting diode arranged to be illuminated if the sensed voltage drops substantially below the normal positive voltage of the protected circuit. The on-line indicator 9 connected to fuse F1 comprises an NPN transistor Q1 with a collector resistor R3 and positive collector voltage bias supply +Vcc. Base-emitter bias is provided by the resistor network R1, R2 and R4, with the junction of R1 and R2 connected to the anode of voltage sensing diode D1 and the base of Q1 to the junction of R2 and R4. The negative base bias supply −Vbb is connected to R4, as shown. The emitter of Q1 is grounded. The bias supply voltages +Vcc and −Vbb and the resistor values of R1, R2 and R4 are chosen so that the normal power supply output voltage +V1 will back the bias the diode D1, and also with diode D1 so back biased, the transistor Q1 will be heavily conducting or saturated. Thus when the circuit is operating and fuse F1 good, the so-called stand-by condition, the voltage at the junction of R1 and R2 will be somewhat less positive then +V1. The indicator LED for fuse F1 is LED1 and it is connected from the collector of Q1 to ground in series with current-limiting resistor R9. In the stand-by condition, the voltage at the collector of Q1 will be too low to illuminate LED1. However, if fuse F1 blows for any reason, the positive voltage +V1 would be removed from the cathode of D1 and D1 would become forward biased because of the positive voltage on its anode. This will result in additional current flowing through R1, D1 and Load #1 from bias supply +Vcc. This added current lowers the base voltage of Q1 below ground which cuts off Q1 and causes its collector voltage to rise to such a level that LED1 will become illuminated.

The second on-line indicator 11 comprises the same circuitry connected to load #2 and to fuse F2. If the positive voltage +V2 which supplies the second load circuit 7 differs from +V1, then the resitors R6, R7 and R8 and the bias voltages +Vcc and −Vbb of indicator circuit 11 would be selected to provide the desired back biasing of voltage sensing diode D2 with the circuit operating and F2 good. LED2 is the visual on-line indicator of circuit 11. The operation of on-line indicator 11 is the same as on-line indicator 9, described above.

The circuit of FIG. 1 is provided with a master fuse status indicator 13 which is arranged to illuminate LED3 if either or both of the on-line indicators 9 or 11 are activated by a faulty fuse. The master indicator 13 forms the output of an OR gate, the inputs of which are the collectors of the transistors Q1 and Q2. The collector of Q1 is connected to the anode of isolating diode D3 and the collector of Q2 to the anode of similar diode D4. The cathodes of both of these diodes are connected together and form the input of master indicator 13. The indicator 13 may comprise simply the LED3 in series with its current limiting resistor R11, or it may additionally include an audible alarm 15 in parallel with LED3 to provide an audible as well as visual indication of fuse failure. It is apparent that with this circuitry, the master indicator 13 is activated whenever either one or both of the on-line indicators 9 or 11 is activated. Also it can be seen that the diodes D3 and D4 prevent activation of the other on-line indicator when one of them is illuminated.

Figure 2:
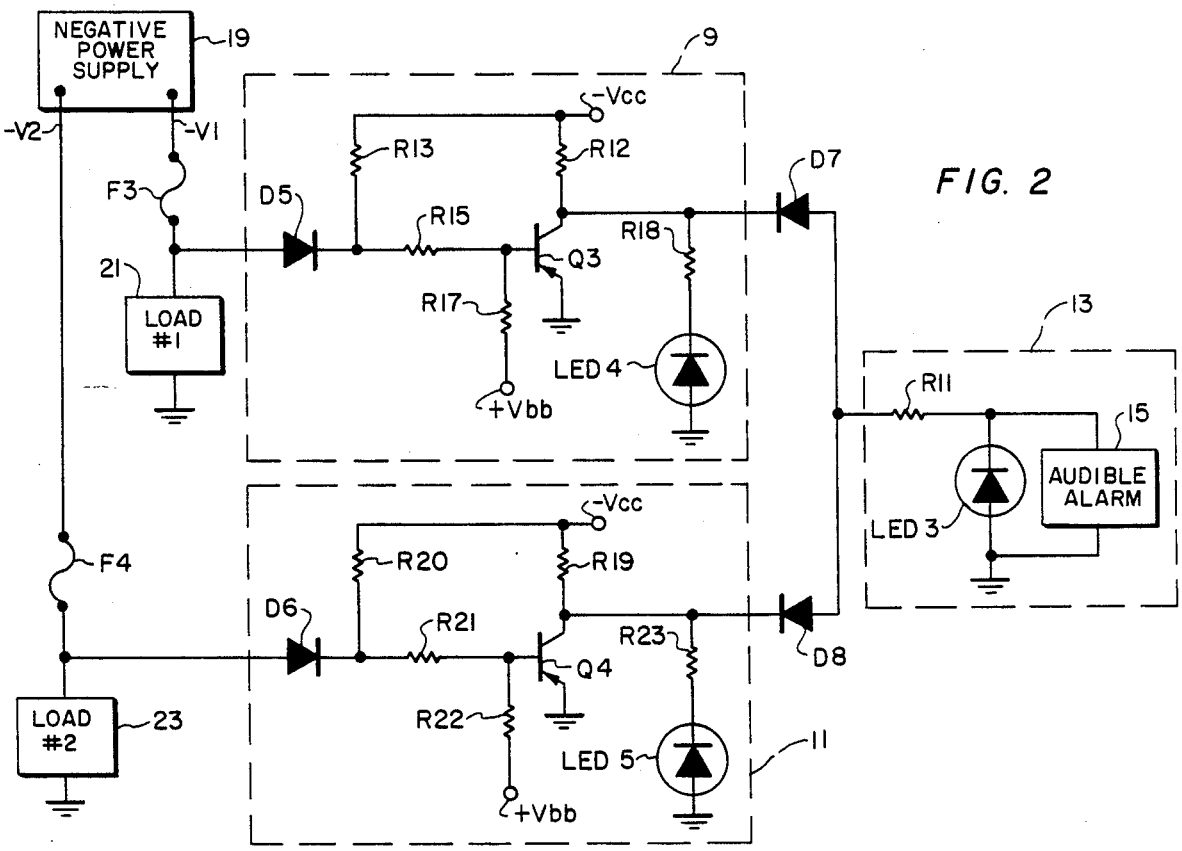
FIG. 2 shows a similar circuit adapted for use with negative power supplies.

FIG. 2 is a variation of the fuse status indicator system of FIG. 1 adapted to operate with a negative polarity power supply 19, which has negative outputs of −V1 and −V2. It can be seen that this circuit is similar to FIG. 1 but with the polarities of all of the diodes and LEDs reversed, with PNP transistors substituted for the NPN transistors of FIG. 1, and with the bias supply voltage polarities reversed. Thus, in the first on-line indicator 9 of FIG. 2, the anode of diode D5 is connected to load #1, 21, which is protected by fuse F3. The collector bias supply of PNP transistor Q3, −Vcc, is negative and the base bias supply, +Vbb, is positive. In the stand-by or operating condition with fuse F3 good, the voltage at the junction of R13 and R15 is chosen to back bias D5 and thus this junction voltage must be less negative than −V1. Also, the bias supply voltages and the three series resistors R13, R15 and R17 are chosen so that the base of Q3 is normally slightly negative so that Q3 is saturated and indicator LED4 thus not illuminated in the stand-by condition. If the fuse F3 becomes open-circuited, the diode D5 will become forward biased and will cause additional current through R13 which will be sufficient to raise the bias voltage of Q3 to ground level or higher and thus cut off Q3 and illuminate the on-line indicator LED4 connected to the collector thereof. The second on-line indicator 11 of FIG. 2 is the same as the first one, 9, but the resistor values of R20, R21, and R22 and the bias supply voltages would be selected to accommodate the negative load voltage −V2 according to the criteria explained above for on-line indicator 9. The master fuse status indicator 13 of FIG. 2 functions in the same way as does the same circuit of FIG. 1. The isolating diodes D7 and D8 are reversed in polarity compared to the isolating diodes of FIG. 1.

Thus in the circuits of both FIGS. 1 and 2, the normally back biased voltage sensing diodes sense the load voltages and become forward biased whenever the absolute value of the load voltage decreases appreciably below its normal value.

As noted above, both of the circuits of FIGS. 1 and 2 draw current when in the stand-by condition when the fuses are good, which is the great majority of the time. The fuse status indicator systems of FIGS. 3 and 4 do not draw any appreciable current in the stand-by condition. In both of these circuits, the on-line LED indicators are connected across each individual fuse being protected, and when the protected fuse opens due to a short circuit or other excessive current drain in the load connected thereto, the entire power supply voltage is applied to the on-line indicator LED. With this arrangement, different power supply polarities can be accommodated by merely connecting the on-line indicator LEDs to the fuse with the proper polarity. Another feature of the circuits of FIGS. 3 and 4 is that they utilize opto-isolator circuits between each of the on-line indicators and the master fuse status indicator, so that there is no conductive path through leakage or other desired currents could flow.

Figure 3:
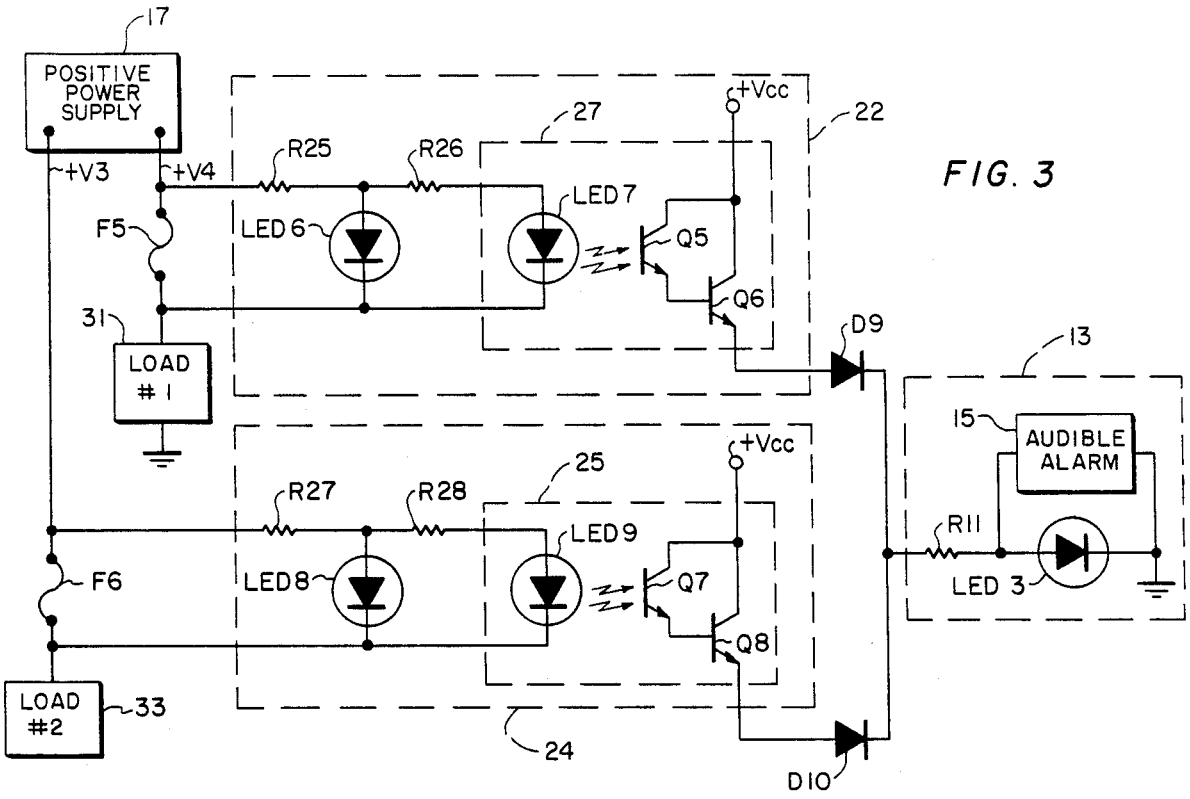
FIG. 3 shows a fuse status indicator system which utilizes a photo-Darlington type of opto-isolator.

The circuit of FIG. 3 comprises a positive power supply 17 with two positive output voltages +V3 and +V4 supplying power to loads 33 and 31 via fuses F6 and F5, respectively. The on-line indicator 22 for fuse F5 comprises LED6 and its series resistor R25, connected across fuse F5. It is apparent that in the event of short circuit in load #1, 31, all of the positive voltage +V4 would be applied across R25 and LED6 and cause illumination thereof. A photo-Darlington opto-isolator 27 is connected to LED6. The LED7 of opto-isolator 27 is connected in series with its current limiting resistor R26 across the LED6. Thus both of these LEDs will become illuminated upon the failure of fuse F5. The LED7 is arranged so that its light output illuminates and renders conductive the two transistors Q5 and Q6 which are connected in the Darlington configuration with the two collectors connected together and the emitter of Q5 connected to the base of Q6. The two collectors are connected to the positive bias supply +Vcc. The emitter of Q6 is connected to the anode of isolating diode D9. All of the circuitry within dashed-line box 22 comprises the on-line indicator circuit associated with fuse F5 and box 24 the identical on-line indicator circuitry for fuse F6. The opto-isolator 25 of circuit 24 comprises LED9 and the Darlington connected transistors Q7 and Q8. LED8 is the on-line indicator of circuit 24. The isolating diode for this circuit is D10. Both of the isolating diodes D9 and D10 are connected to master fuse status indicator 13, which comprises the same circuitry as the master indicators of the previously described embodiments and functions in the same way. In FIG. 3, operation of either one or both of on-line indicator circuits 22 or 24 will cause master indicator 13 to become activated by illumination of its LED.

Figure 4:
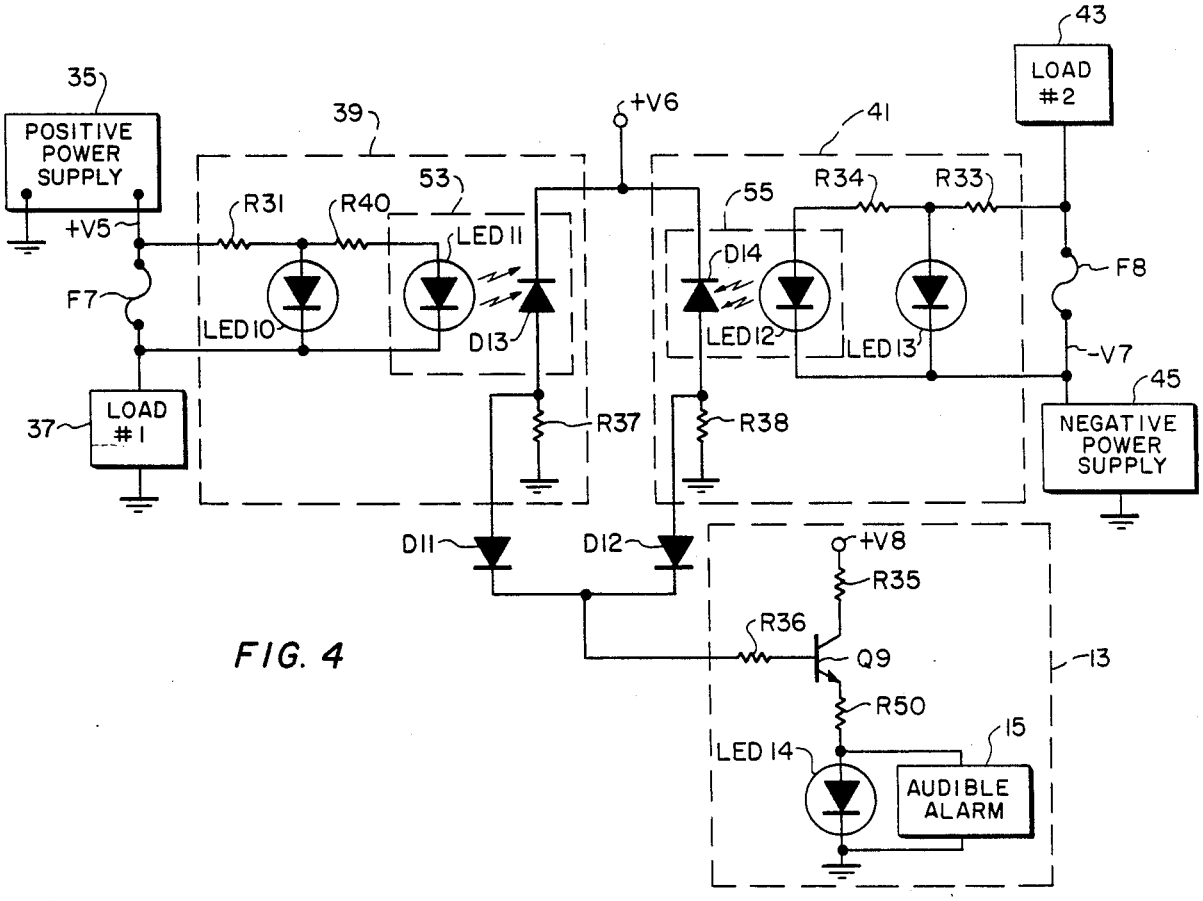
FIG. 4 is a diagram of a fuse status indicator system utilizing another type of opto-isolator.

The circuit of FIG. 4 operates similarly to that of FIG. 3 but it utilizes opto-isolators which include back biased diodes in place of Darlington-connected transistors. Also, in FIG. 4 each of the on-line indicator circuits 39 and 41 accommodate power supplies of different polarity. The positive power supply 35 supplies load #1, 37, through fuse F7 which has on-line indicator circuit 39 connected thereto. The indicator diode LED10 is connected in series with its current limiting resistor R31 across fuse F7, with the cathode of the LED connected to the load 37, as shown. Thus a short circuit in the load will apply the positive voltage +V5 of power supply 35 to the anode of LED10, thus illuminating it. The opto-isolator, 53, of circuit 39 comprises LED11, connected in parallel with LED10 through its series resistor R40 and back biased diode D13 having its cathode connected to positive bias supply +V6 and having resistor R37 connecting its anode to ground. The blowing of fuse F7 will illuminate both LED10 and LED11. The light output of LED11 will fall on D13 and render this diode conducting in the reverse direction, causing a positive voltage across R37. This positive voltage is applied to master fuse status indicator 13 via isolating diode D11.

The other on-line indicator circuit 41 of FIG. 4 is arranged to accommodate a negative power supply 45 which is connected to load #2, 43, via fuse F8. The circuit 41 comprises indicator LED13 with its cathode connected to the negative terminal of power supply 45 which applies the negative voltage −V7 to the load 43. The LED12 of the opto-isolator 55 is connected in series with R34 across LED13 and its light output is arranged to illuminate back biased diode D14 which also has its cathode connected to voltage supply +V6. The resistor R38 is connected between the anode of D14 and ground. Circuit 41 functions just as does circuit 39 to produce a positive voltage upon the failure of its protected fuse, which voltage is applied to the master fuse status indicator 13 through isolating diode D12. The master indicator circuit 13 is somewhat different from the previously described one in that it includes a transistor amplifier to amplify the low power positive voltage applied thereto from the online indicators 39 and 41. The diodes D11 and D12 have their cathodes connected together and to resistor R36 which is connected to the base transistor Q9, the emitter of which as the LED14 and its resistor R50 connected thereto, with the audible alarm circuit 15 connected in parallel with LED14. The collector of Q9 is connected to positive voltage supply +V8 via R35. Thus the positive currents applied to the base-emitter circuit through the diodes D11 and D12 will render Q9 conductive and illuminate LED14 and sound the audible alarm 15.

The system of FIG. 3 could be used with power supplies with both positive and negative voltages, as does the system of FIG. 4. For example, in FIG. 3, if the voltage +V3 were negative, the on-line indicator LED8 connected to fuse F6 would simply be reversed in polarity with its anode connected to load #2, 33.

Also, the two LEDs of each of the on-line indicators of FIGS. 3 and 4 could in some cases be consolidated into a single LED which sould provide both the visual indication of the blown fuse and also function as part of the opto-isolated. Thus for example in FIG. 4, a single LED could perform the functions of LED10 and LED11. This would not be possible if the opto-isolators were sealed units so that the LEDs thereof would not be visible.

While the illustrated embodiments show only two on-line indicators connected to a single master indicator, many more such on-line indicators may be connected to a single master indicator.

While the invention has been illustrated in connection with preferred embodiments, obvious variations thereof are possible without departing from the novel concepts disclosed herein, accordingly the invention should be limited only by the scope of the appended claims.

What is claimed is:

1. A fuse status indicator system comprising, one or more power supplies comprising a plurality of voltage outputs supplying separate loads, a fuse connecting each of said voltage outputs to each of said loads, an on-line indicator connected to each of said fuses, said on-line indicators each comprising a first light emitting diode which is passive and not illuminated if its protected fuse is good and which becomes illuminated if its protected fuse opens due to a short circuit or excessive current drain in the said load connected thereto, and a master fuse status indicator comprising a second light emitting diode connected to each of said on-line indicators by means of OR gates, said second light emitting diode of said master indicator adapted to become illuminated whenever any one of the said on-line indicators connected thereto beomes illuminated.

2. The system of claim 1 wherein each of said on-line indicators comprises a voltage sensing diode which in the stand-by condition with its protected fuse good will be back biased and said voltage sensing diode is arranged to become forward biased if the voltage across said load decreases appreciably in absolute value from its normal positive or negative value.

3. The system of claim 1 wherein said first light emitting diode is connected across its said protected fuse, whereby upon a short circuit in said load connected to said fuse, said first light emitting diode will become illuminated, said on-line indicator further comprising an opto-isolator circuit arranged to produce an output when the said first light emitting diode becomes illuminated, the output of said opto-isolator being connected to said master fuse status indicator via one of said OR gates.

4. A fuse status indicator system comprising, one or more power supplies which are provided with a plurality of output voltages which may be of positive or negative polarity, said output voltages being connected to separate loads via separate fuses, an on-line indicator circuit connected to each of said fuses, said on-line indicator circuits each comprising first visual means which are arranged to become illuminated on the failure of its protected fuse, and wherein groups of said on-line indicators are connected via an OR gate to a single master fuse status indicator which comprises second visual means which is arranged to become illuminated upon the failure of any one of the fuses connected to said on-line indicators.

5. The system of claim 4 wherein said first visual means are all located on a single electronic sub-assembly such as a circuit board and said second visual means is located on the console or main control panel in which said sub-assembly is located.

* * * * *